(12) United States Patent
Wallace

(10) Patent No.: US 8,534,216 B2
(45) Date of Patent: Sep. 17, 2013

(54) DEVICE AND METHOD FOR BOARDING AN AIRCRAFT

(75) Inventor: Robert James Wallace, Northcote (AU)

(73) Assignee: RoundPeg Innovations PTY Ltd., Northcote, Victoria (AU)

(*) Notice: Subject to any disclaimer, the term of this patent is extended or adjusted under 35 U.S.C. 154(b) by 448 days.

(21) Appl. No.: 12/997,563

(22) PCT Filed: Jun. 4, 2009

(86) PCT No.: PCT/AU2009/000700
§ 371 (c)(1),
(2), (4) Date: Mar. 10, 2011

(87) PCT Pub. No.: WO2009/149491
PCT Pub. Date: Dec. 17, 2009

(65) Prior Publication Data
US 2012/0018582 A1    Jan. 26, 2012

(30) Foreign Application Priority Data

Jun. 10, 2008 (AU) .................................. 2008902934
Nov. 17, 2008 (AU) .................................. 2008905895

(51) Int. Cl.
*B64F 1/30* (2006.01)
*G06Q 50/00* (2012.01)
*G09F 3/00* (2006.01)
*G09F 19/22* (2006.01)

(52) U.S. Cl.
USPC .......................................... 116/200; 116/201

(58) Field of Classification Search
USPC .................. 116/200, 201, 205, 209; 434/72, 434/75; 52/33, 174; 701/433, 434
See application file for complete search history.

(56) References Cited

U.S. PATENT DOCUMENTS

| | | | |
|---|---|---|---|
| 3,046,908 A | 7/1962 | Der Yuen | |
| 3,421,239 A | 1/1969 | Smith | |
| 3,747,147 A | 7/1973 | Weese | |
| 4,398,257 A | 8/1983 | Paganini et al. | |
| 5,006,983 A | 4/1991 | Wayne et al. | |
| 6,338,041 B1 | 1/2002 | Kawamata | |
| 6,529,786 B1 | 3/2003 | Sim | |
| 6,578,795 B2 | 6/2003 | Romca et al. | |
| 6,732,975 B2 | 5/2004 | Peterson | |
| 6,766,986 B2 | 7/2004 | Konya | |
| 7,044,371 B2 | 5/2006 | Dove et al. | |

(Continued)

FOREIGN PATENT DOCUMENTS

| DE | 102009031019 A1 * | 12/2010 |
|---|---|---|
| EP | 0839960 A2 | 5/1998 |

(Continued)

OTHER PUBLICATIONS

Ferrari, Pieric, Robustness of Efficient Passenger Boarding in Airplanes, Inst. for Land and Sea Transport Systems, Nov. 17, 2004, Dept. of Computer Science, ETH Zurich, CH.

(Continued)

*Primary Examiner* — R. A. Smith
(74) *Attorney, Agent, or Firm* — McAfee & Taft

(57) ABSTRACT

A device (10) for arranging a plurality of individuals into a desired order. The device includes a floor plan (14) having a plurality of separately identifiable markings (16) thereon indicating an intended location for each individual on the floor plan (14).

13 Claims, 1 Drawing Sheet

(56) References Cited

U.S. PATENT DOCUMENTS

| | | |
|---|---|---|
| 7,047,205 B2 | 5/2006 | Hale et al. |
| 7,178,954 B2 | 2/2007 | Blechschmidt |
| 7,182,040 B2 | 2/2007 | Pharo et al. |
| 7,188,582 B2 | 3/2007 | Pharo et al. |
| 7,243,878 B2 | 7/2007 | Peterson et al. |
| 7,263,593 B2 | 8/2007 | Honda et al. |
| 7,344,109 B1 | 3/2008 | Rezai |
| 7,366,853 B2 | 4/2008 | Honda et al. |
| 7,412,942 B2 | 8/2008 | Pharo et al. |
| 2001/0029882 A1 | 10/2001 | Pharo et al. |
| 2002/0004835 A1 | 1/2002 | Yarbrough |
| 2002/0046692 A1 | 4/2002 | Pharo et al. |
| 2002/0066400 A1 | 6/2002 | Pharo et al. |
| 2003/0061080 A1 | 3/2003 | Ross |
| 2003/0102956 A1* | 6/2003 | McManus et al. ............. 340/5.2 |
| 2004/0004158 A1 | 1/2004 | Peterson |
| 2004/0190757 A1 | 9/2004 | Murphy et al. |
| 2005/0001096 A1 | 1/2005 | Peterson |
| 2005/0002198 A1 | 1/2005 | Blechschmidt |
| 2005/0065834 A1 | 3/2005 | Hale et al. |
| 2005/0125266 A1 | 6/2005 | Bramnick et al. |
| 2005/0258230 A1 | 11/2005 | Wiater |
| 2006/0117186 A1 | 6/2006 | Yeo |
| 2006/0176150 A1 | 8/2006 | Rehn |
| 2006/0195676 A1 | 8/2006 | Honda et al. |
| 2006/0206353 A1 | 9/2006 | Buschi et al. |
| 2006/0278764 A1 | 12/2006 | Zhao |
| 2007/0101520 A1 | 5/2007 | Hutton |
| 2007/0107277 A1 | 5/2007 | Simms et al. |
| 2007/0162721 A1 | 7/2007 | Honda et al. |
| 2007/0192558 A1 | 8/2007 | Honda et al. |
| 2007/0265890 A1 | 11/2007 | Curtis |
| 2012/0281017 A1* | 11/2012 | Seegers et al. ................ 345/629 |

FOREIGN PATENT DOCUMENTS

| | | |
|---|---|---|
| EP | 0965952 A2 | 12/1999 |
| JP | 2004-5112 | 1/2004 |
| JP | 2004-192313 | 7/2004 |
| JP | 2004-227558 | 8/2004 |
| JP | 2005-135009 | 5/2005 |
| JP | 2005-274244 | 10/2005 |
| JP | 2006-72885 | 3/2006 |
| JP | 2006-318328 | 11/2006 |
| JP | 2007-048323 | 2/2007 |
| JP | 2007279518 A * | 10/2007 |
| RU | 2276807 C1 | 5/2006 |
| WO | WO 2006/021684 A1 | 3/2006 |
| ZA | 2002/3384 | 12/2002 |

OTHER PUBLICATIONS

Steffen, Jason H., Optimal boarding method for airline passengers, pp. 1-14, Elsevier, Jul. 8, 2008.

Cook, Dr. Andrew et al., Evaluating the True Cost to Airlines of One Mintue of Airborne or Ground Delay, Transport Studies Group, Univ. of Westminster, London, GB May 2004.

Van Den Briel, Menkes H.L., America West Airlines Develops Efficient Boarding Strategies, Interfaces, vol. 35, No. 3, May-Jun. 2005, pp. 191-201.

The Role of Computer Simulation in Reducing Airplane Turn Time, http://www.boeing.com/commercial/aeromagazine/aero_01/textonly/t01txt.html, printed Nov. 9, 2007.

Nyquist, D.C., Journal of Air Transport Management 14 (2008) pp. 202-204.

Bachmat, Eitan, Analysis of Airplane Boarding Times, pp. 1-24.

Wallace, Robert James, Written Opinion of the International Searching Authority, PCT/AU2009/000700, Jun. 29, 2009.

Wallace, Robert James, International Preliminary Report on Patentability, PCT/AU2009/000700, Jun. 2, 2010.

* cited by examiner

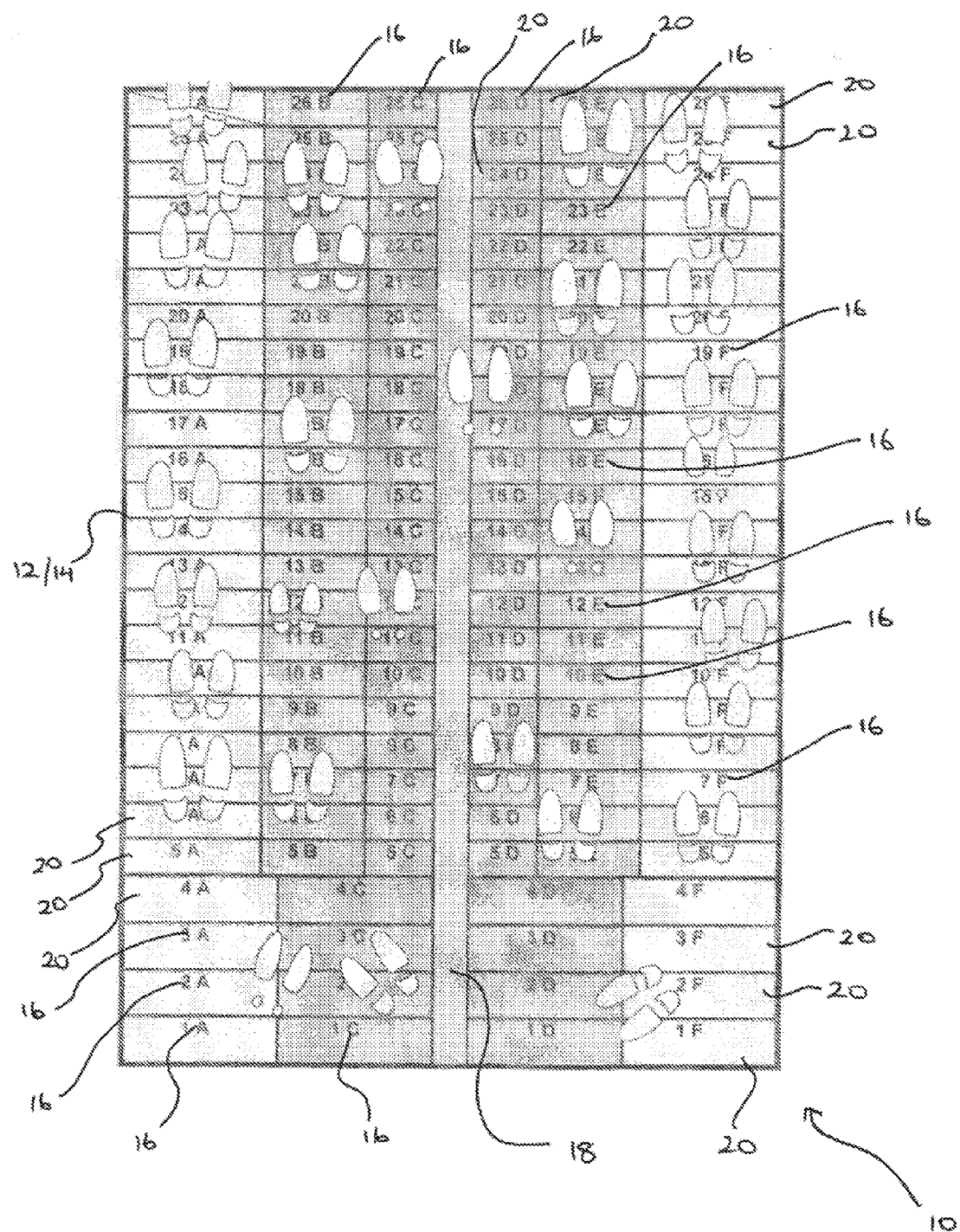

DEVICE AND METHOD FOR BOARDING AN
AIRCRAFT

The present invention relates to a device and method for arranging a plurality of individuals into a desired order. The device and method have particular relevance in the context of the efficient boarding of passengers onto an aircraft and so will be herein generally described in this context. However, it is to be appreciated that the device and method may be used in the context of other applications, including in the boarding of individuals onto other types of passenger vehicles, and for the seating of individuals in stadiums and other gatherings of individuals.

Reference to aircraft in the following description and claims is understood to provide a context for the invention but not limit the invention to that particular application.

BACKGROUND TO THE INVENTION

The time taken for passengers to board an aircraft is a problem for all parties involved; passengers, airports and airlines. With the growth in the number of flights and passengers worldwide the problem is of increasing significance, compounded by the increase in size of aircraft, which can now carry more than 800 passengers.

Apart from inconvenience there is a very real economic cost. Given the very large investment in aircraft and airports, any delay is costly. Of particular concern is the "turn-around time" which must be minimised to enable aircraft to maintain their schedules, and avoid missing their "take-off slots". As well as delaying the particular flight, this can cause delays for all subsequent flights of the aircraft, possibly several per day, compounding the costs and inconvenience.

Much effort has been made by airlines to streamline boarding in order to get passengers into the aircraft expediently by minimising congestion. Various procedures have been adopted by some airlines but they are all considered to be far from perfect.

A number of studies have been carried out on behalf of airlines by universities and others to analyse existing boarding procedures with a view to developing improved and/or new methods. Some of these are referred to below.

"Optimal Boarding Method for Airline Passengers", Steffen, Jason H., Physorg.com, February 2008, describes a computer simulation of boarding methods which shows that the author's proposed boarding method, in which rows of passengers sitting together are boarded in alternating sequences, is more efficient. This is quite plausible but it undesirably requires a high degree of airline staff input to manage the procedure and willingness of passengers to co-operate with regimentation.

"Robustness of Efficient Passenger Boarding in Airplanes", Ferarri & Nagel, ETH Zurich, Switzerland, November 2004, describes the results of computer simulations comparing different boarding systems, and indicates that the "back to front" boarding method favoured by many airlines is not the best, and paradoxically, it works better when passengers do not follow the assigned group.

"America West Airlines Develops Efficient Boarding Strategies", Menkes van den Briel et al, Arizona State University, United States of America, May 2005, describes a research project commissioned by an airline, comprising computer analysis of various boarding systems and video observations of passengers at a major airport. This document proposes the "reverse pyramid" method of boarding, where passengers are called in certain sequential groups as the best way of minimising congestion, but unfortunately does not suggest any means of achieving this.

"The Role of Computer Simulation in Reducing Airplane Turn Time", Marelli et al, Boeing Commercial Aircraft Group, discloses with the aid of bar charts that more efficient boarding can make a significant difference to aircraft turnaround times. This document also describes a method of computer analysis validated by observation of passenger behaviour, but unfortunately does not propose how more efficient boarding can be achieved "Analysis of Airplane Boarding Times", Bachmat et al, Ben-Gurion University, Israel, describes a highly mathematical method of modelling and analysing the process of passengers boarding an airplane, but makes no recommendations about any procedure.

US Patent Application No. 2007/0265890 A1, entitled "Interactive Electronic Boarding Display", describes a visual display which is updated as passengers proceed to board aircraft. This is useful information for waiting passengers but it does not amount to a boarding system to clearly improve the efficiency of aircraft turn-around times.

It would thus be desirable to improve the efficiency of boarding passengers on an aircraft. It would also be desirable to at least partially address some of the shortcomings of existing and proposed methods, strategies and devices identified above.

SUMMARY OF THE INVENTION

According to a first aspect of the present invention, there is provided a device for arranging a plurality of individuals into a desired order. The device comprises a floor plan having a plurality of separately identifiable markings thereon indicating an intended location for each individual on the floor plan. The separately identifiable markings are of a size and shape to allow only a subset of the plurality of individuals to stand on the respective markings at any given time.

The term 'floor plan' is to be understood in a non-limiting sense. The plan may be provided on a floor, on the ground or on any other suitable underlying surface.

In one preferred form, the device can be used to arrange a plurality of individuals into a desired order prior to boarding a passenger vehicle. The device is contemplated for potential use with a variety of different passenger vehicle types. In one particularly preferred form, the device may be used to arrange a plurality of individuals into a desired order prior to boarding a passenger aircraft. In such a form, each of the plurality of separately identifiable markings may typically correspond to a respective seat on the aircraft. As such, the respective markings may take the form of 1A, 1C, 1D, 1F, 2A, 2C and so on, or whatever may be the specific seat numbering sequence used on a given aircraft. Accordingly, it can be appreciated that the floor plan represents the seating plan of the aircraft about to be boarded.

It is envisaged that the markings may be provided on the floor plan in sequential order, so as to simplify use of the device for individuals and enable them to easily identify their respective intended location on the floor plan. This has the added benefit that individuals are organised into their general allocated seat order, thereby potentially allowing the individuals to enter the aircraft cabin and reach their seats more quickly and efficiently, without being held up by other individuals blocking the aisles.

Moreover, in such an arrangement it is envisaged that the plurality of separately identifiable markings may be arranged in a two dimensional array on the floor plan. As such, the markings may be provided in a layout generally corresponding to the seating plan (or part thereof) of the aircraft in question. Aisles between seats, entry and exit doors and other in-cabin features may be included on the floor plan to provide further clarity of the plan, such that passengers are more easily able to visualise where on the aircraft they are to be seated relative to other individuals standing on the floor plan around them, and relative to the aircraft cabin features depicted on the floor plan.

Of course, the floor plan may adopt any other suitable form and need not generally depict or represent an aircraft seating plan. An alternative floor plan may be developed from trial and error, from past experience or may be computer generated.

The applicant envisages that the floor plan can also be provided in the form of two or more separate floor plan sub-sets. For example, the floor plan may include two sub-set floor plans located proximate to each other; with one subset floor plan corresponding to seats in even numbered rows of the aircraft, and the second sub-set floor plan corresponding to seats in odd numbered rows. In another form, two sub-sets may be provided corresponding the left and right hand sides of the aircraft cabin. Further sub-sets may be provided by separating the floor plan into first, business and economy class sub-sets. Passengers standing on one sub-set floor plan may board the aircraft before those of the other sub-set floor plan(s), or may board in another suitably determined order.

In a preferred form, the floor plan is of a size and shape to allow only a subset of the plurality of individuals to stand on their respective markings at any given time. As such, the device assists in pre-arranging passengers such that they board the plane in a sequential order and in small groups, so they can take their seats quickly and easily without congestion. Passengers board in appropriately small groups of, for example, around twenty or so, in relatively rapid succession.

The floor plan is configured such that large groups of passengers having adjacent allocated seats are unable to stand on the floor plan at the same time. As such, the floor plan can be used to ensure that the small groups of passengers boarding the plane do so in order and are relatively widely dispersed around the aircraft cabin. This is considered to provide a relatively efficient arrangement to assist in the boarding of passengers.

The floor plan may be provided in any appropriate form. It may be applied directly on or to the floor in front of the airport departure door. It may instead be provided in a temporary light or laser display on the floor from an overhead projector or other display device. This provides the possibility of ready adjustment of the floor plan to suit the specific type of aircraft to be boarded. A light or other display may be provided in the floor, again providing the potential for ready adjustment of the plan to suit the aircraft in question. In one particularly preferred form, the device is provided in the form of a mat or carpet having an upwardly facing surface, with the floor plan provided on the upwardly facing surface.

Whatever form the device takes, preferably the floor plan is adjustable, thereby facilitating a change in the number, layout or visibility of separately identifiable markings thereon. Again, this enables the device to be used in the boarding of passengers on aircraft with differing seating plans.

The invention also relates to an assembly area comprising a device as described above.

According to a further aspect of the present invention, there is provided a method for arranging a plurality of individuals into a desired order. The method comprises providing a floor plan having a plurality of separately identifiable markings thereon indicating an intended location for each individual on the floor plan. The method also comprises instructing the plurality of individuals to stand on the floor plan, with each individual allocated a separately identifiable marking; and having each individual stand at least proximate to their respective separately identifiable marking. The separately identifiable markings are of a size and shape such that the plurality of individuals are required to stand on the floor plan in turn in subsets of individuals.

In a preferred form, the floor plan is of a size and shape such that the plurality of individuals are required to stand on the floor plan in turn in subsets of individuals.

The method may be used in respect of arranging aircraft passengers in a desired order prior to boarding an aircraft, so as to facilitate efficient boarding of the aircraft, with each of the markings corresponding to an aircraft seat number or other identifier.

The method may comprise the step of directing each subset of individuals, in turn, to board a plane in the approximate arrangement of individuals provided by the floor plan.

Such a method involves pre-arranging passengers such that they enter an aircraft in a sequential order and potentially dispersed widely, so they can take their seats quickly and easily without congestion. Again, passengers may board in small groups of around twenty or so, in rapid succession. The specific size of each subset may be selected to optimize boarding efficiency.

The floor of the departure lounge, just upstream of the entry gate to the aircraft, may be marked with the floor plan depicting the aircraft seating plan on a reduced scale, including seat numbers, so as to form an assembly area. When the aircraft is ready to be boarded an announcement may be made by airport or airline staff requesting passengers to proceed to the assembly area and stand on their designated seat number. As soon as the group has formed they proceed onto the aircraft, maintaining their position. Being in the correct sequence they should be able to go directly to their seats without having to push past each other.

Because the floor plan is at a reduced scale compared to the actual aircraft seating plan only a small proportion of passengers can fit on the floor plan at one time. The first passengers to come forward and stand on their allocated seat numbers have priority. If there is insufficient room for a passenger with an adjacent seat or row, that passenger has to step back and join the next boarding group, shortly thereafter (for example, a minute or two later). This ensures that when the compact group enters the plane, as well as being in the right order they will be well dispersed throughout the plane, and able to stow their baggage and be seated without interfering with each other.

In one possible form, the method of the present invention may be used in conjunction with a computer generated (or otherwise generated) passenger ordering sequence. In one form, this may comprise passengers being called one at a time and in a specified order to stand on the floor plan. This may be useful in situations where certain passenger boarding groups, for whatever reason, are incapable of arranging themselves onto the floor plan prior to boarding an aircraft. It may also be useful in giving certain passengers boarding priority. For example, passengers with special needs such as illness or pregnancy, parents with young children, passengers having certain privileges (such as frequent flyers or airline club memberships).

The method may comprise each passenger separately being called to stand on the floor plan in their designated position by name or seat number allocation.

Bar codes (or other suitable identifiers) provided on passenger boarding passes (or elsewhere) may be read electronically by a suitably positioned bar code reader so as to further verify that passengers are in the correct position and order when standing on the floor plan and/or upon entering the aircraft cabin. This further ensures that passengers board the aircraft in the correct order and most efficient manner.

The use of a bar code reader may trigger a visual display to further assist each passenger to stand in the correct position on the mat prior to boarding the aircraft.

The method may also be used in conjunction with suitably positioned signs, information screens or the like; as well as with audio or video information messages.

Illuminated lines, numbers and other markings may be provided on and around the floor plan to assist passengers taking their respective positions on the floor plan. Overhead markings, potentially comprising illuminated displays on the ceiling above or adjacent the floor plan may also be provided.

The method may comprise the projection of images onto the floor plan or adjacent the floor plan to assist passengers in the overall boarding process. Moreover, the floor plan itself may be a video, laser or other suitable image that is displayed on the floor.

It will be convenient to hereinafter describe a preferred embodiment of the invention with reference to the accompanying drawing. The particularity of the drawing is to be understood as not limiting the preceding broad description of the invention.

BRIEF DESCRIPTION OF THE DRAWING

FIG. 1 is a plan view of a device for arranging a plurality of individuals into a desired order, according to one aspect of the present invention.

DETAILED DESCRIPTION OF THE DRAWING

Referring to FIG. 1, there is illustrated a device 10 provided in the form of a mat (or carpet) 12 for arranging a plurality of individuals into a desired order. The device 10 comprises a floor plan 14 provided on the upwardly facing surface of the mat 12. The mat 12 has a plurality of separately identifiable markings 16 (only some of which are specifically identified for clarity) thereon indicating an intended location for each individual on the floor plan 14.

The device 10 is configured to arrange a plurality of passengers into a desired order prior to boarding a passenger aircraft (although could be reconfigured for use in other applications requiring the assembly of individuals into a desired order). As such, it can be seen that each of the plurality of separately identifiable markings 16 corresponds to a respective seat on the aircraft, with the respective markings comprising seat numbers in the form of 1A, 1C, 1D, 1F, 2A, 2C and so on. The mat 12 is intended to be placed in an appropriate passenger assembly area such as at an airport terminal departure gate.

It can be seen that the markings 16 are provided on the floor plan 14 in sequential order and in a two dimensional array, thereby generally corresponding to the layout of seats of the aircraft in question. The specific array would generally be selected so as to correspond to the seating plan of the aircraft about to be boarded. The device 10 may be placed immediately before an aircraft terminal departure gate or at any other suitable location.

An aisle 18 between seats is included to provide further clarity of the plan 14, such that passengers are more easily able to visualise where on the aircraft they are to be seated relative to other passengers standing on the floor plan 14 around them.

It is to be appreciated that the floor plan 14 is of a size and shape to allow only a subset of the passengers to stand on their respective markings 16 (ie. their designated seat numbers) at any given time. In other words, the plan 14 is of reduced size when compared to the actual aircraft cabin floor space. Because of this reduced size, when passengers board the plane in sequential order and in small groups, the group can expand, allowing them to take their seats quickly and easily without congestion.

Passengers board the plane in appropriately small groups of, for example, around twenty or so, in relatively rapid succession. The floor plan 14 is configured such that large groups of passengers having adjacent allocated seats are unable to stand on the floor plan 14 at the same time. Any passenger not initially able to stand on the plan 14 because of overcrowding would be provided with a subsequent opportunity to stand on the plan 14 and then board the plane. Such a boarding process may be controlled by airport or airline staff or may be controlled by a suitable automated arrangement. Thus, it can be appreciated that the floor plan 14 can be used to ensure that the small groups of passengers boarding the plane do so in sequential seat order and relatively widely dispersed within the plane. This is considered to provide a relatively efficient arrangement to assist in the boarding of passengers onto the aircraft.

Again, the floor plan 14 is preferably adjustable, thereby enabling the device 10 to be used in the boarding of passengers on aircraft with differing seating plans.

In use, instructions are provided to passengers about to board the aircraft in question to, if sufficient standing space is available on the plan 14, stand on their seat number 16.

Preferably, the mat 12 is located on the floor of a boarding lounge located in front of the gate leading to the aircraft, orientated such that the rearmost seats represented on the plan 14 are nearest the gate.

The floor plan 14 is of a size and shape such that the passengers are required to stand on the floor plan, in turn, in subsets (or small groups) of passengers.

Once the floor plan is covered by the maximum practical number of passengers standing thereon, those passengers are directed to (in their approximate seat order) board the aircraft; at which time other passengers move to their seat number on the floor plan 14 and, when the plan 14 is again covered by passengers, those passengers are also directed to board the aircraft. This process continues with small groups of passengers until all passengers have boarded the aircraft. The specific size of each subset may be selected to optimize boarding efficiency.

This boarding method has the desirous consequence that passengers are potentially able to assemble and pre-arrange themselves, according to their allocated seats, in sequential order which minimises congestion during boarding the aircraft.

Superimposed on the plan 14 are the footprints F (only some of which are specifically identified with an 'F') of the passengers who have stepped forward to join a boarding group. In the illustrated embodiment, all of the passengers in rows five to twenty-six are formed up in an orderly fashion, ready to proceed onto the aircraft. The passengers standing casually on rows one to four are business class passengers, who potentially do not like regimentation. Nevertheless, they will follow the main group and take their seats without inconvenience. Although not illustrated, standing on the right (and/ or left) of the mat 12 are passengers who could not fit on the floor plan because their seat number was overlapped by another passenger who was there first. They will potentially be able to claim their position in the next group.

The representation of the aircraft seating plan on the floor plan 14 may be further distorted from that illustrated, so as to alter the number of passengers that are able to stand of the plan 14 at any given time, thereby potentially optimising the efficiency of the boarding procedure.

In FIG. 1 it can be seen that the length reduction of the floor plan 14 compared to the actual aircraft seating plan is greater than the width reduction. This has the desirable effect of preventing passengers in adjacent rows assembling simultaneously. Further, the width reduction is not uniform in that the rectangular spaces 20 depicting aisle seats are narrower (only some of the spaces 20 have been specifically labelled with '20'). This has the desired effect of giving priority to passengers with window seats, again potentially maximising the efficiency of aircraft boarding.

As well as using effects of scale, the plan 14 may incorporate other ways of prioritising spaces, eg. overlapping, interleaving, or superimposing spaces 20 or groups of spaces.

The spaces 20 need not be rectangular. They could adopt any suitable form, such as (possibly numbered) circles or any other shape(s).

The device 10 being provided in the form of a mat or carpet provides a generally portable arrangement which may be laid on the floor in the most favourable location. The mat or carpet may be rolled up and replaced with one having different markings, corresponding to different airlines and/or aircraft. Alternatively, the mat could be generic, catering for the largest aircraft, in association with moveable barriers or cover mats to confine passengers to the smaller aircraft seating configurations.

Other devices, including signs, electronic display screens, recorded announcements and moving images, may also be used to convey information and assist passengers to arrange themselves in order.

As well as aircraft, this method of arranging people in the most favourable order for entering or leaving an area could be applied wherever congestion of people occurs when they have to take up positions, such as sporting stadiums and theatres, and in emergency situations.

Thus, the present invention potentially provides an improved device and more efficient method for boarding passengers.

Finally, it is to be understood that the various alterations, modifications and/or additions may be introduced into the construction and arrangement of the parts previously described without departing from the spirit or ambit of this invention.

The invention claimed is:

1. A device for arranging a plurality of individuals into a desired order, the device comprising a floor plan having a plurality of separately identifiable markings thereon indicating an intended location for each individual on the floor plan wherein the separately identifiable markings are of a size and shape to allow only a subset of the plurality of individuals to stand on their respective markings at any given time.

2. A device according to claim 1, when used to arrange a plurality of individuals into a desired order prior to boarding a passenger vehicle.

3. A device according to claim 2, wherein the passenger vehicle is a passenger aircraft.

4. A device according to claim 1, wherein each of the plurality of separately identifiable markings correspond to a respective seat on the aircraft.

5. A device according to claim 4, wherein the plurality of separately identifiable markings are arranged in sequential order.

6. A device according to claim 5, wherein the plurality of separately identifiable markings are arranged in a two dimensional array on the floor plan.

7. A device according to claim 6, wherein the plurality of separately identifiable markings are arranged to generally correspond to at least a portion of an aircraft seating plan layout.

8. A device according to claim 7, wherein the markings differ in size and/or shape.

9. A device according to claim 1, wherein the device is provided in the form of a mat or carpet having an upwardly facing surface, with the floor plan provided on the upwardly facing surface.

10. A device according to claim 1, wherein the floor plan is adjustable, thereby facilitating a change in the number, layout or visibility of separately identifiable markings thereon.

11. An assembly area for assembling a plurality of individuals in a desired order, the assembly area including a device according to claim 1.

12. A method for arranging a plurality of individuals into a desired order, comprising:
   providing a floor plan having a plurality of separately identifiable markings thereon indicating an intended location for each individual on the floor plan;
   instructing the plurality of individuals to stand on the floor plan, with each individual allocated a separately identifiable marking; and
   having each individual stand at least proximate to their respective separately identifiable marking;
   wherein the separately identifiable markings are of a size and shape such that the plurality of individuals are required to stand on the floor plan, in turn, in subsets of individuals.

13. A method according to claim 12, comprising the step of directing each subset of individuals, in turn, to board a plane in the approximate arrangement of individuals provided by the floor plan.

* * * * *